United States Patent
Edwards et al.

(10) Patent No.: US 10,937,082 B2
(45) Date of Patent: Mar. 2, 2021

(54) VEHICLE RECOMMENDATION SYSTEM USING SENSORS

(71) Applicant: Toyota Motor North America, Inc., Plano, TX (US)

(72) Inventors: Michael C. Edwards, McKinney, TX (US); Mark McClung, Frisco, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 124 days.

(21) Appl. No.: 16/228,507

(22) Filed: Dec. 20, 2018

(65) Prior Publication Data

US 2020/0202410 A1 Jun. 25, 2020

(51) Int. Cl.
| | | |
|---|---|---|
| *G06Q 30/00* | (2012.01) | |
| *G06Q 30/06* | (2012.01) | |
| *G07C 5/00* | (2006.01) | |

(52) U.S. Cl.
CPC ..... *G06Q 30/0631* (2013.01); *G06Q 30/0641* (2013.01); *G07C 5/008* (2013.01)

(58) Field of Classification Search
None
See application file for complete search history.

(56) References Cited

U.S. PATENT DOCUMENTS

| | | |
|---|---|---|
| 6,571,197 B1 | 5/2003 | Frank et al. |
| 6,711,474 B1 | 3/2004 | Treyz et al. |
| 8,660,943 B1 | 2/2014 | Chirehdast |
| 9,189,798 B2 | 11/2015 | Title et al. |
| 9,466,161 B2 | 10/2016 | Ricci |
| 9,477,978 B1 | 10/2016 | Oakes, III et al. |
| 2008/0294532 A1 | 11/2008 | Osborne |
| 2010/0152960 A1 | 6/2010 | Huber et al. |
| 2011/0313647 A1* | 12/2011 | Koebler ............. B60L 3/12 701/123 |
| 2014/0129080 A1* | 5/2014 | Leibowitz ......... G06Q 30/0631 701/33.3 |
| 2015/0095156 A1* | 4/2015 | Sauerbrey ............ H04W 4/021 705/14.58 |
| 2016/0198306 A1 | 7/2016 | Miles et al. |

(Continued)

FOREIGN PATENT DOCUMENTS

AU       2002301438       10/2002

OTHER PUBLICATIONS

Zheng Qin, "Introduction to E-commerce", 2009, Springer, springer.com (Year: 2009).*

(Continued)

*Primary Examiner* — Naeem U Haq
*Assistant Examiner* — Norman Donald Sutch, Jr.
(74) *Attorney, Agent, or Firm* — Snell & Wilmer LLP

(57) ABSTRACT

Methods and systems for recommending future vehicles. The system includes one or more sensors of a current vehicle configured to detect sensor data. The system includes a vehicle transceiver of the current vehicle configured to communicate the sensor data. The system includes a remote data server configured to receive the sensor data from the current vehicle, and determine one or more vehicles to recommend to the driver of the current vehicle based on the received sensor data. The system includes a computing device coupled to the remote data server and configured to display the one or more vehicles to be recommended to the driver of the current vehicle.

16 Claims, 5 Drawing Sheets

(56) References Cited

U.S. PATENT DOCUMENTS

| | | | |
|---|---|---|---|
| 2016/0292768 A1* | 10/2016 | Needham | G06F 16/951 |
| 2017/0004561 A1 | 1/2017 | Rackley et al. | |
| 2017/0270580 A1 | 9/2017 | Esposito et al. | |
| 2017/0337573 A1* | 11/2017 | Toprak | G07C 5/006 |
| 2017/0352267 A1 | 12/2017 | Tzirkel-Hancock et al. | |
| 2020/0082287 A1* | 3/2020 | Beaurepaire | G07C 5/085 |

OTHER PUBLICATIONS

Joe Wiesenfelder; "Which is Better: A Minivan or a Pickup Truck?"; Jul. 24, 2017; cars.com (Year: 2017).*

Jeff S. Bartlett; "Forward-Collision Warning With Braking to Become Standard"; Sep. 11, 2015; Consumer Reports (Year: 2015).*

Juan Guerror-Ibanez et al; "Sensor Technologies for Intelligent Transportation Systems"; Apr. 16, 2018; University of Colima, Mexico (Year: 2018).*

PTO-892 Reference Y: Jóhannes Ingi Ámason et al; "Volvo intelligent news: A context aware multi modal proactive recommender system for in-vehicle use"; Jul. 5, 2014; Pervasive and Mobile Computing 14 (2014) 95-111 (Year: 2014).*

Chen et al.; "*A Novel Top-K Automobiles Probabilistic Recommendation Model Using User Preference and User Community*"; *2014 IEEE 11th International Conference on e-Business Engineering*; pp. 105-111; 2014.

\* cited by examiner

VEHICLE RECOMMENDATION SYSTEM USING SENSORS

BACKGROUND

1. Field

This specification relates to a system and a method for recommending vehicles to individuals based on vehicle sensor data.

2. Description of the Related Art

A prospective vehicle purchaser may perform research on a new vehicle in many different ways. The prospective vehicle purchaser may conduct research online by reading reviews from vehicle experts, the prospective vehicle purchaser may ask friends or family about their opinions of their respective vehicles, or the prospective vehicle purchaser may simply go to a vehicle dealership and ask the advice of a salesperson. In each of these conventional ways, the prospective vehicle purchaser depends on the impressions of others and the vehicle purchasing (or leasing) decision is made on a largely imprecise basis. The prospective vehicle purchaser may test drive a vehicle, but during the short amount of time of a test drive, the prospective vehicle purchaser may only be able to form aesthetic evaluations of the vehicle. In many situations, the prospective vehicle purchaser may purchase a vehicle similar to the one the prospective vehicle purchaser currently owns, even if the prospective vehicle purchaser has difficulties operating their current vehicle.

Thus, there is a need for a more focused and informative manner of determining which vehicle a prospective vehicle purchaser should purchase.

SUMMARY

What is described is a system for recommending future vehicles. The system includes one or more sensors of a current vehicle configured to detect sensor data. The system includes a vehicle transceiver of the current vehicle configured to communicate the sensor data. The system includes a remote data server configured to receive the sensor data from the current vehicle, and determine one or more vehicles to recommend to the driver of the current vehicle based on the received sensor data. The system includes a computing device coupled to the remote data server and configured to display the one or more vehicles to be recommended to the driver of the current vehicle.

Also described is a system for recommending future vehicles. The system includes one or more sensors of a current vehicle configured to detect sensor data. The system also includes a vehicle transceiver of the current vehicle configured to communicate the sensor data. The system also includes a computing device. The computing device is configured to receive the sensor data from the current vehicle, determine one or more vehicles to recommend to the driver of the current vehicle based on the received sensor data, and display the one or more vehicles to be recommended to the driver of the current vehicle.

Also described is a method for recommending vehicles. The method includes detecting, by one or more sensors of a current vehicle, sensor data associated with operation of the vehicle. The method also includes communicating, by a vehicle transceiver of the current vehicle to a remote data server, the sensor data. The method also includes analyzing the sensor data from the current vehicle to determine one or more vehicles to recommend to the driver of the current vehicle. The method also includes displaying the one or more vehicles to recommend to the driver of the current vehicle.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for recommending a new vehicle to purchase. The systems and methods described herein use sensors of a current vehicle of a driver to detect data associated with the driver's capabilities and preferences. The sensor data is analyzed to determine one or more other subsequent vehicles that may better suit the driver when the driver is interested in a new vehicle.

The systems and methods described herein are an improvement to conventional methods of determining a new vehicle to purchase, as the systems and methods described herein use data that is unique and personalized to the driver to provide a tailored recommendation to the driver. While general surveys and quizzes exist that may match a prospective vehicle purchaser to one or more vehicles, these conventional surveys and quizzes do not rely on actual vehicle sensor data and instead rely on the driver's prioritization of desired features of a vehicle. The driver's prioritization of desired features of a prospective vehicle may not completely inform the driver's purchasing decision, as the driver may not be fully aware of a mismatch between the driver's needs and the features of the driver's current vehicle.

As used herein, "driver" may refer to a human driver of a vehicle or one or more processors configured to operate an autonomous or semi-autonomous vehicle. "Driver" may also be used herein to refer to the operator of the vehicle and the owner or lessee of the vehicle. "Driver" may also be used to refer to a user of the vehicle when the vehicle is driven autonomously and/or when the vehicle is being used as a service provided by a transportation company (e.g., a ride-sharing company, a limousine company, an autonomous vehicle transportation company, a taxi company).

Figure 1A:
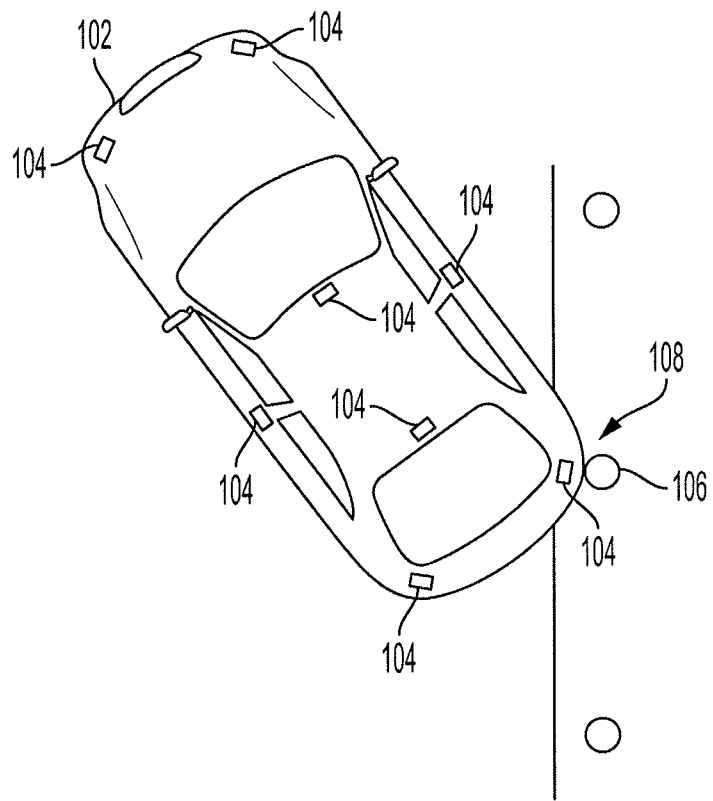
FIG. 1A illustrates a vehicle detecting a collision with a pole, according to various embodiments of the invention.

FIG. 1A illustrates an overhead view of a vehicle 102 colliding with a pole 106. The vehicle 102 includes multiple sensors 104. The sensors 104 may include spatial sensors configured to detect spatial data of the environment around the vehicle 102. The sensors 104 may also include image sensors configured to detect image data of the environment around the vehicle 102. The sensors 104 may also include vibration sensors configured to detect when contact has been made with an object, such as pole 106. The sensors 104 may also include an engine sensor, a motor/generator sensor, a transmission sensor, a steering wheel sensor, one or more weight sensors, an accelerator pedal sensor, a fuel efficiency sensor, an inertial measurement unit, and/or a brake pedal sensor.

When contact is made with an object, such as pole 106, the sensor data detected by the sensors 104 is recorded and stored by the vehicle 102. The sensor data may include any image data, spatial data, or vibration data detected by the sensors 104. The sensor data may be used to determine a location 108 on the vehicle 102 where contact was made with the object. The location 108 may be accurate to a square inch of the vehicle 102. The location 108 may be determined by combining data from the various sensors 104. For example, a vibration sensor and an image sensor may be used in combination to determine the location 108 by combining an intensity of contact and relative distance from the image sensor.

The state of the vehicle 102 may also be detected using sensor data to determine a context for the collision. For example, the engine sensor may indicate that the vehicle was operating normally, the transmission sensor may indicate that the vehicle was in reverse, the steering wheel sensor may indicate sporadic movement by the driver prior to the collision, the accelerator pedal sensor may track engagement of the accelerator pedal by the driver prior to the collision, and the brake pedal sensor may track engagement of the brake pedal by the driver prior to the collision.

Once the location 108 of the collision is determined and once the sensor data associated with the state of the vehicle (e.g., engine sensor data, transmission sensor data, steering wheel sensor data, accelerator pedal sensor data, brake pedal sensor data) is detected, the location 108 of the collision and the sensor data associated with the state of the vehicle may be stored by a memory. The memory may be local to the vehicle 102 or may be remote.

Figure 1B:
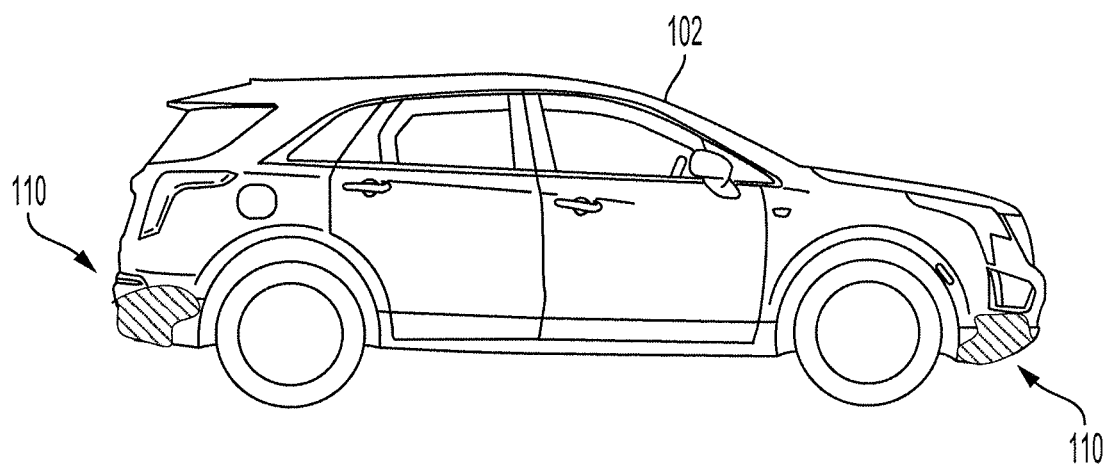
FIG. 1B illustrates a side view showing damage sustained by the vehicle of FIG. 1A, according to various embodiments of the invention.

FIG. 1B illustrates a side view of the vehicle 102 illustrating damage 110 that may be sustained by the vehicle 102 as a result of the vehicle 102 colliding with various objects. As shown in FIGS. 1A and 1B, the vehicle 102 is a relatively large vehicle, similar to a sports utility vehicle. The driver of the vehicle 102 may be uncomfortable or unfamiliar with the dimensions of the vehicle 102, and as a result, the vehicle 102 may sustain damage 110, as shown in FIG. 1B.

The vehicle 102 may detect many types of sensor data and may store the detected sensor data in memory. The sensor data may be analyzed to recommend a different vehicle to the driver when the driver is in a position to change vehicles. For example, if the sensors indicate that the driver of the vehicle 102 frequently collides with objects or other vehicles in locations and situations that indicate the driver is unfamiliar and uncomfortable with the dimensions of the vehicle 102, a different vehicle may be suggested when the driver is shopping for another vehicle or when the lease of the current vehicle expires.

The suggested subsequent vehicle may have smaller dimensions or dimensions similar to a previous vehicle that the driver was able to operate without any collisions. In another example, if the sensors indicate that the driver of the vehicle 102 frequently has occupants at maximum capacity, a larger vehicle may be suggested. In another example, if the sensors indicate that the driver of the vehicle 102 frequently leaves many seats unoccupied, a smaller vehicle may be suggested. In yet another example, if the sensors indicate that the driver of the vehicle 102 frequently carries large amounts of cargo, a truck or sports utility vehicle may be suggested instead of the coupe that is currently being driven.

The sensor data from the vehicle 102 may be communicated to a remote computing device. The remote computing device may analyze the sensor data from the vehicle 102, and the remote computing device may determine trends based on the sensor data. The trends may indicate needs or deficiencies that a next vehicle may be able to better address.

Figure 2:
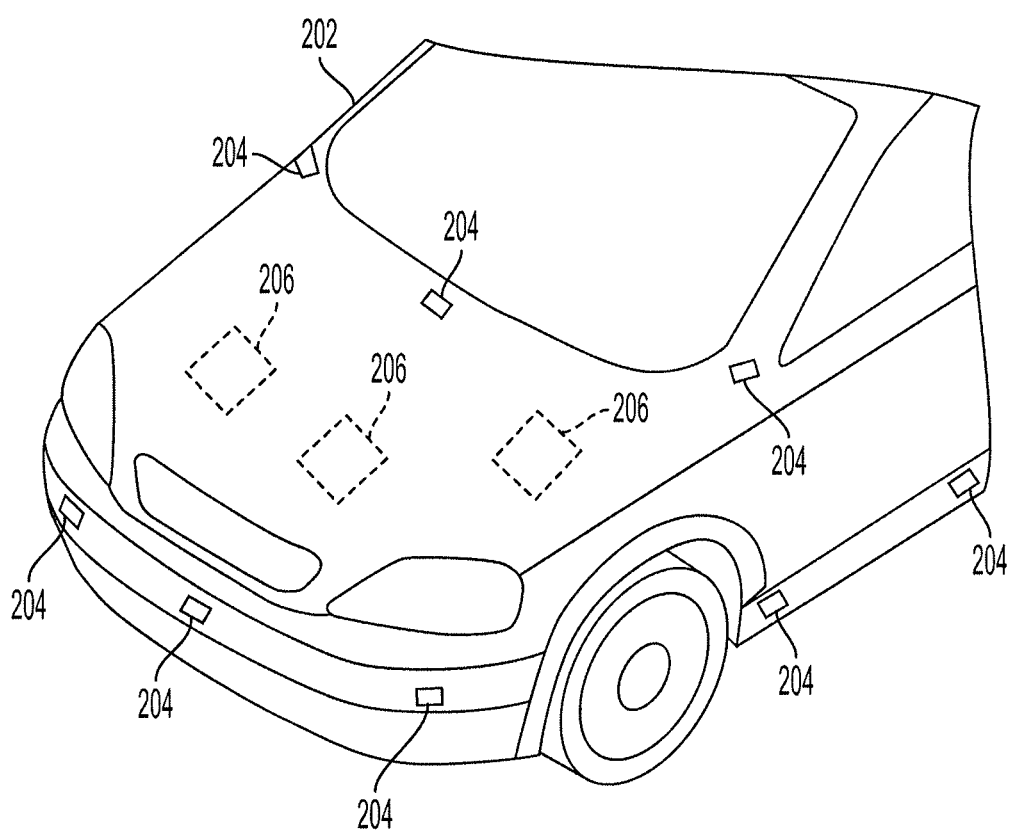
FIG. 2 illustrates a vehicle with various sensors, according to various embodiments of the invention.

FIG. 2 illustrates a plurality of sensors located on a vehicle 202, according to embodiments of the invention. The sensors may include a plurality of exterior sensors 204 and a plurality of interior sensors 206.

The exterior sensors 204 may include spatial sensors configured to detect spatial data of the environment around the vehicle 202. The exterior sensors 204 may also include image sensors configured to detect image data of the environment around the vehicle 202. The exterior sensors 204 may include vibration sensors configured to detect when contact has been made with an object. The vibration sensors may also be configured to detect a distance from the vibration sensor where contact was made with the object.

The exterior sensors 204 may be located on an exterior surface of the vehicle 202. The exterior sensors 204 may be spaced apart from each other in such a manner that substantially all regions of the vehicle 202 are covered by at least one exterior sensor 204. The data from the exterior sensors 204 may be used to determine whether contact has been made with an object and the location of where contact was made with the object. For example, detected image data may be analyzed to identify a type of object that the vehicle 202 made contact with, as well as any object attributes, such as object height, object width, object shape, or object color. For example, the image data may be used to determine that the vehicle 202 performs more adjustments than normal when parallel parking near a green curb or near objects on the curb that are less than 2 feet tall. The normal number of adjustments made in a parallel parking maneuver may also be detected from sensor data from a plurality of vehicles.

The interior sensors 206 may include an engine sensor configured to detect engine data, such as engine speed or speed of the vehicle. The interior sensors 206 may also include a motor/generator sensor configured to detect motor/generator data, such as rate of electricity use. The interior sensors 206 may also include a transmission sensor configured to detect a transmission state (e.g., park, drive, reverse, neutral) at any given time. The interior sensors 206 may also include a steering wheel sensor configured to detect steering wheel data including a steering wheel position over time, a rate of turning over time, and a direction of turning. The interior sensors 206 may also include an accelerator pedal sensor configured to detect accelerator pedal data including an accelerator pedal position over time and a rate of engagement of the accelerator pedal over time. The interior sensors 206 may also include a brake pedal sensor configured to detect brake pedal data including a brake pedal position over time and a rate of engagement of the brake pedal over time. The interior sensors 206 may also include passenger weight sensors to determine how many passengers are in the vehicle at a given time and which seats they are occupying. The interior sensors 206 may include a location sensor configured to detect a location of the vehicle 202. The interior sensors 206 may include a cargo weight sensor to detect an amount of cargo being carried by the vehicle. The interior sensors 206 may include a vehicle speed sensor configured to detect a speed that the vehicle 202 is travelling. The interior sensors 206 may include a fuel efficiency sensor configured to determine an efficiency of fuel (e.g., gasoline or electricity) consumed by the vehicle 202.

In some embodiments, the data from the interior sensors 206 is used to determine a state of the vehicle 202 when a collision is detected by the exterior sensors 204. For example, when the vehicle 202 makes contact with an object, and the transmission sensor indicates the vehicle is in drive, the engine sensor indicates the vehicle is travelling at 45 miles per hour, and the steering wheel sensor indicates that the vehicle was slowly turned at a 10 degree angle to the right prior to the detected collision, it may be determined that the vehicle 202 was executing a lane change maneuver when the collision occurred. When a statistically significant number of collisions are detected at a similar location when the vehicle is making a maneuver, this may indicate that the driver is unable to view other vehicles or has a poor feel for the dimensions of the vehicle 202. Further, when a statistically significant number of collisions occur while the vehicle is being parallel parked, this may indicate that the driver is not skilled at parallel parking, and a suggested subsequent vehicle may include improved parking sensors or automated parallel parking.

In some embodiments, the data from the interior sensors 206 is used to determine improvements that may be addressed by a subsequent vehicle. For example, the fuel efficiency data detected by the fuel efficiency sensor may be analyzed to determine whether the driver would benefit from a more fuel-efficient vehicle. The cost of fuel may be obtained, and a dollar amount of savings from a more fuel-efficient vehicle may be presented to the driver. In another example, when the location sensors detect that the vehicle 202 is frequently in camping areas, and the vehicle 202 is a sedan, a sports utility vehicle better suited for all-terrain driving may be suggested.

Any of the sensors described herein may be used by conventional vehicles for other conventional purposes. For example, conventionally, image sensors and spatial sensors are used to provide feedback to the driver when parking or for providing feedback to the driver regarding maintaining position in a driving lane or for providing feedback to the driver regarding the presence of another vehicle or object in a blind spot of the vehicle. In another example, conventionally, passenger weight sensors are used to provide reminders for passengers to buckle their respective seat belts. However, in the systems and methods described herein, these conventional components are used in unconventional ways, in order to determine suggestions for future vehicles for the driver.

Figure 3A:
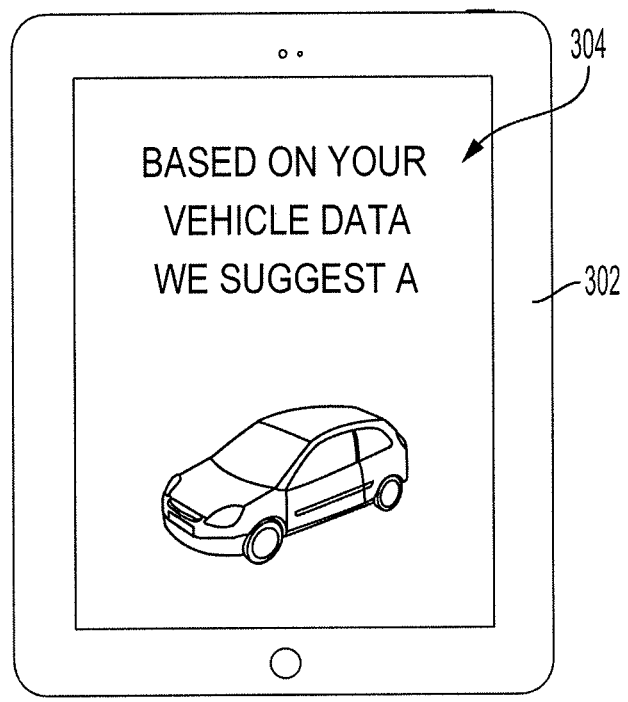
FIGS. 3A-3B illustrate a display screen and a graphical user interface for recommending a new vehicle to purchase, according to various embodiments of the invention.

FIG. 3A illustrates a user interface 304 displayed by a display screen of a device 302. The user interface 304 may be generated by computer software executed by a computing device that is specially programmed and specially constructed to facilitate vehicle sales.

The computing device may automatically analyze the sensor data from the driver's vehicle to determine a recommendation for the driver's next vehicle. For example, the driver's current vehicle may detect sensor data as described herein. The driver's current vehicle may communicate the sensor data to the computing device (or to a remote data server accessible by the computing device). The computing device may analyze the sensor data from the current vehicle to determine one or more recommended new vehicles.

The computing device may use one or more algorithms to determine the one or more recommended new vehicles. For example, the computing device may determine a frequency of collision at a particular vehicle location, and when the frequency of collision exceeds a threshold frequency, the computing device may determine that the new vehicle should have an improved profile at that particular vehicle location, or improved sightlines or improved sensors to assist the driver in avoiding collisions.

In another example, the computing device may track the number of occupants in the current vehicle over a most recent period of time (e.g., a month, six months, a year, two years) to determine an average or median number of occupants in the vehicle. The computing device may determine a number of minutes elapsed with each particular number of occupants. For example, in the past year, the current vehicle may have had 1 occupant for 31,320 minutes; 2 occupants for 9,122 minutes; 3 occupants for 150 minutes; 4 occupants for 240 minutes; 5 occupants for 29 minutes; 6 occupants for 0 minutes; and 7 occupants for 12 minutes. Based on the percentage of time spent with more than 5 occupants in the vehicle over the past year, the computing device may recommend a smaller vehicle. For example, when the time spent with 6 or more occupants in the vehicle is less than 2% of all driving time, the computing device may recommend a smaller vehicle.

In yet another example, the computing device may track a cargo weight of the vehicle over a most recent period of time (e.g., a month, six months, a year, two years) to determine an average or median amount of cargo transported by the vehicle. The computing device may determine a number of minutes elapsed with varying weights of cargo. For example, in the past year, the vehicle (a truck) may have spent 41,022 minutes carrying under 100 pounds of cargo in the truck bed; 1,199 minutes carrying 100-250 pounds of cargo in the truck bed; 102 minutes carrying 250-500 pounds of cargo in the truck bed; 62 minutes carrying 500-1,000 pounds of cargo in the truck bed; and 22 minutes carrying more than 1,000 pounds of cargo in the truck bed. Based on the percentage of time spent carrying cargo of more than 250 pounds of cargo in the truck bed, the computing device may recommend a smaller truck or a sport utility vehicle. The driver may not realize how little the driver has been utilizing the cargo capacity of the truck, and may determine that a truck may be rented for times where more than 250 pounds of cargo are to be transported.

Conventionally, the vehicle purchaser or salesperson may not have taken data of this granularity into consideration when purchasing a vehicle. The vehicle purchaser may have made incorrect or inaccurate representations in their mind about their use of their current vehicle. For example, a large SUV owner may believe that the large SUV is often used to transport 5 or more individuals, but the sensor data may indicate that there is only a small fraction of time where 5 or more individuals are transported using the large SUV, and a wagon or a smaller SUV may suffice. Accordingly, the vehicle owner may be better informed using the sensors and data detected by the sensors.

Figure 3B:
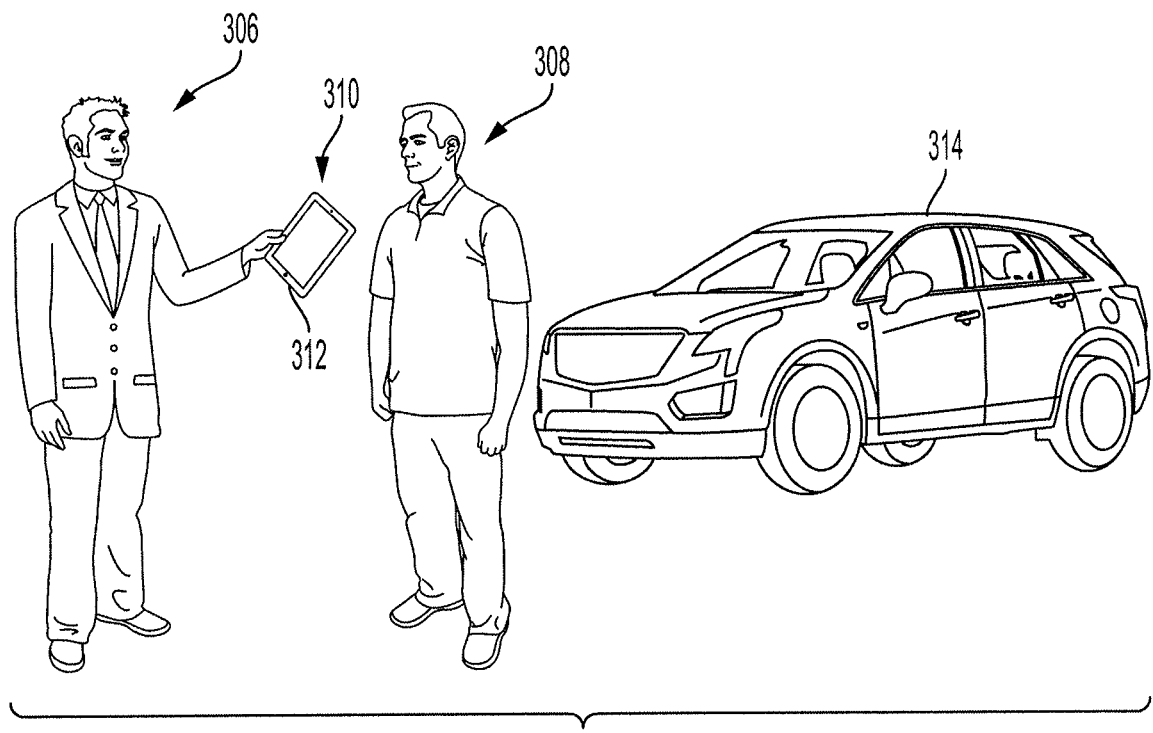

The computing device may display in the user interface 304 a suggested vehicle based on the sensor data of the driver's current vehicle. As shown in FIG. 3B, when the driver 308 is speaking with a salesperson 306, the salesperson may view vehicle recommendation data on a user interface 310. The vehicle recommendation data may be determined by the computing device 312 based on sensor data collected by the current vehicle 314. In some embodiments, more than one vehicle may be suggested as a subsequent vehicle for the driver, and each of the multiple suggested vehicles may have a corresponding score indicating a compatibility with the driver or an increase in compatibility with the driver as compared to the driver's current vehicle. Each vehicle may have an associated ideal driver profile, and based on the sensor data, the driver may have a driver profile constructed by a computing device. The driver's profile and the ideal driver profile of each vehicle may be compared to determine a compatibility score between the driver and each vehicle.

Figure 4:
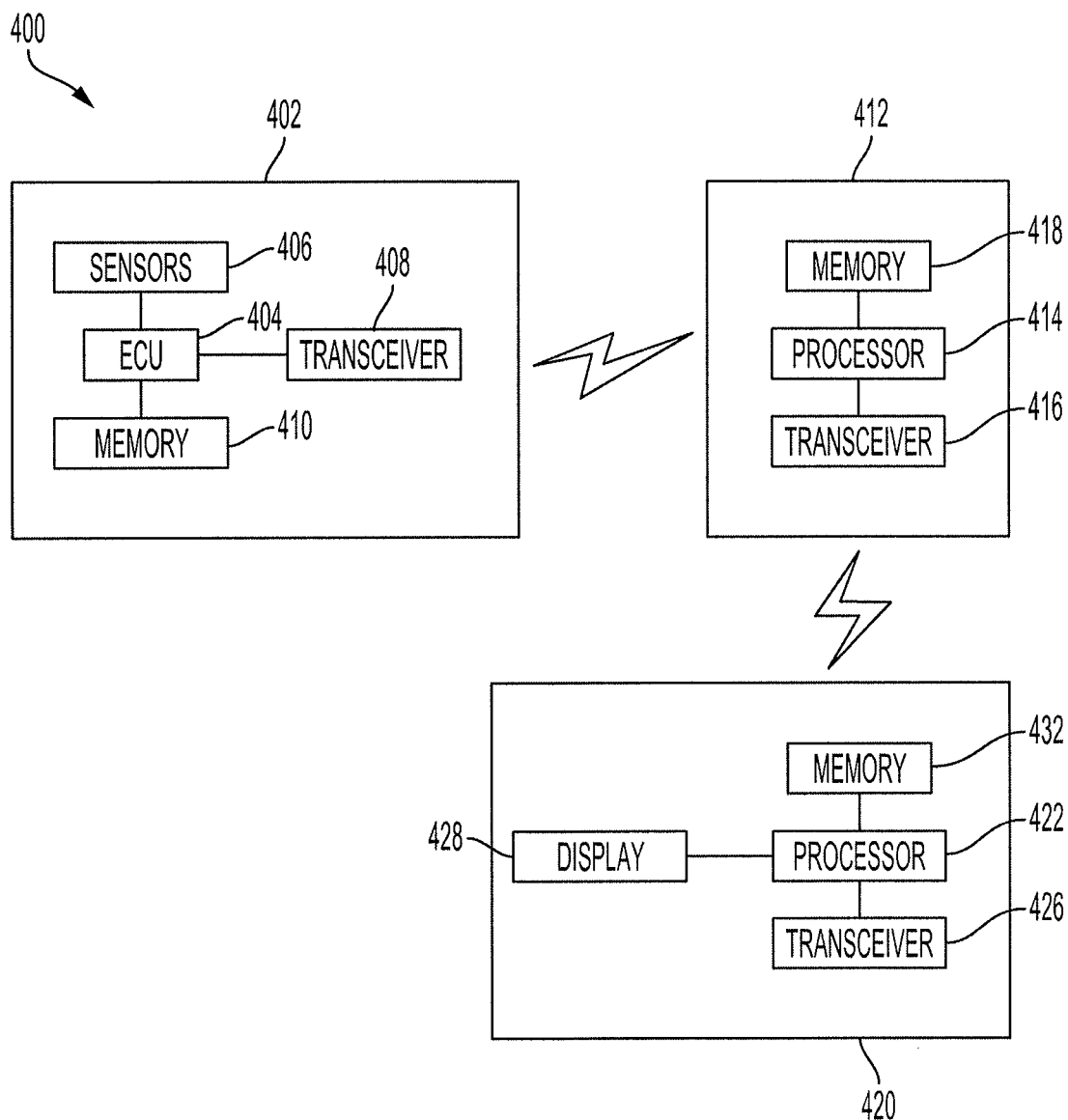
FIG. 4 illustrates a system for recommending a new vehicle to purchase, according to various embodiments of the invention.

FIG. 4 illustrates a block diagram of the system 400. The system 400 includes a vehicle 402. The vehicle 402 may be similar to any of the vehicles described herein, such as vehicle 102, vehicle 202, or vehicle 314.

The vehicle 402 may have an automatic or manual transmission. The vehicle 402 is a conveyance capable of transporting a person, an object, or a permanently or temporarily affixed apparatus. The vehicle 402 may be a self-propelled wheeled conveyance, such as a car, a sports utility vehicle, a truck, a bus, a van or other motor or battery driven vehicle. For example, the vehicle 402 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 402 may be semi-autonomous vehicle or an autonomous vehicle. That is, the vehicle 402 may be self-maneuvering and navigate without human input. An autonomous vehicle may use one or more sensors and/or a navigation unit to drive autonomously.

The vehicle 402 includes an ECU 404 connected to a transceiver 408, sensors 406, and a memory 410. The ECU 404 may be one or more ECUs, appropriately programmed, to control one or more operations of the vehicle. The one or more ECUs 404 may be implemented as a single ECU or in multiple ECUs. The ECU 404 may be electrically coupled to some or all of the components of the vehicle. In some embodiments, the ECU 404 is a central ECU configured to control one or more operations of the entire vehicle. In some embodiments, the ECU 404 is multiple ECUs located within the vehicle and each configured to control one or more local operations of the vehicle. In some embodiments, the ECU 404 is one or more computer processors or controllers configured to execute instructions stored in a non-transitory memory 410. All of the elements of the vehicle 402 may be connected via a communications bus.

The sensors 406 may include spatial sensors configured to detect spatial data of the environment around the vehicle 402, image sensors configured to detect image data of the environment around the vehicle 402, or vibration sensors configured to detect when contact has been made with an object. The sensors 406 may also include an engine sensor, a motor/generator sensor, a transmission sensor, a steering wheel sensor, an accelerator pedal sensor, a brake pedal sensor, one or more passenger weight sensors, a location sensor, one or more cargo weight sensors, a vehicle speed sensor, and a fuel efficiency sensor, each as described herein. The sensors 406 may also include an inertial measurement unit (IMU) configured to detect acceleration data, deceleration data, and orientation data (e.g., roll, pitch, and yaw) of the vehicle 402.

The spatial sensor may be a RADAR or LIDAR sensor, and the image sensor may be a camera or video camera. The engine sensor may be configured to detect an engine speed and state of the engine. The motor/generator sensor may be configured to detect a state of the motor/generator. When the vehicle 402 is a hybrid vehicle, the engine sensor and the motor/generator sensor may be used to determine an amount of usage of each of the engine and the motor/generator. The transmission sensor may indicate a transmission state of the vehicle 402. The transmission sensor may be used in conjunction with image sensors and spatial sensors to determine whether the driver of the vehicle has difficulty in performing certain driving maneuvers, such as parallel parking.

The steering wheel sensor may be configured to detect a steering data of the vehicle 402, and the steering data may be used to determine whether the driver of the vehicle steers the vehicle in an abrupt manner or a slow manner. The image sensors and/or spatial sensors may be used to determine whether the steering patterns of the driver are appropriate, or whether the driver is exhibiting difficulty in steering the vehicle 402. For example, when the image sensors and/or spatial sensors indicate that the driver is not staying in the vehicle's lane, and the steering wheel sensor indicates contemporaneous abrupt corrective maneuvers, the driver of the vehicle 402 may have a difficult time driving the vehicle 402. This may be due to the size and/or dimensions of the vehicle 402, or the responsiveness of the suspension.

The accelerator pedal sensor may be configured to detect accelerator pedal data of the vehicle 402, and the accelerator pedal data may be used to determine whether the driver of the vehicle engages the accelerator pedal in a comfortable and controlled manner. For example, if the sensitivity of the accelerator pedal is too high for the driver, the accelerator pedal data and the throttle data from the engine sensor or motor/generator sensor may indicate abrupt accelerations of the vehicle 402. A subsequent vehicle that is recommended to the driver may have a less sensitive accelerator pedal. By contrast, if the accelerator pedal data indicates that the driver is frequently fully engaging the accelerator pedal, the subsequent vehicle that is recommended to the driver may have a more sensitive accelerator pedal.

The brake pedal sensor may be configured to detect brake pedal data of the vehicle 402, and the brake pedal data may be used to determine whether the driver of the vehicle engages the brake pedal in a comfortable and controlled manner. For example, if the sensitivity of the brake pedal is too high for the driver, the brake pedal data and the IMU data may indicate abrupt decelerations of the vehicle 402. A subsequent vehicle that is recommended to the driver may have a less sensitive brake pedal. By contrast, if the brake pedal data indicates that the driver is frequently fully engaging the brake pedal, the subsequent vehicle that is recommended to the driver may have a more sensitive brake pedal.

The passenger weight sensors may be configured to detect passenger occupancy data of the vehicle 402, as described herein. The passenger occupancy data may be used to recommend a larger or smaller subsequent vehicle for the driver, as described herein.

The location sensor may be configured to detect location data of the vehicle 402. The ECU 404 may use the location data along with map data stored in memory 410 to determine a location of the vehicle. In some embodiments, the location sensor has access to the map data and may determine the location of the vehicle and provide the location of the vehicle to the ECU 404. The location sensor may be a GPS unit or any other global location detection device. The location data may be used to determine location-based trends in the gathered sensor data. Activities of the driver may be inferred based on the location data to recommend different subsequent vehicles. For example, when the location data indicates that the vehicle 402 is frequently in the forest or near a campground, an SUV may be recommended instead of the coupe that the driver is currently driving. In another example, when the location data indicates that the vehicle 402 is frequently in metropolitan areas, a fuel efficient hybrid may be recommended instead of the large sports utility vehicle that the driver is currently driving.

The cargo weight sensors may be configured to detect cargo data of the vehicle 402, as described herein. The cargo data may be used to recommend a larger or smaller subsequent vehicle for the driver, as described herein.

The fuel efficiency sensor may be configured to detect fuel efficiency data of the vehicle 402. The fuel efficiency data may include a rate of consumption of gasoline or electricity. Improvements to fuel efficiency may be determined, and a more fuel efficient subsequent vehicle may be suggested. For example, when the current vehicle has a fuel efficiency of 20 miles per gallon, a more fuel-efficient vehicle (i.e., a vehicle achieving greater than 20 miles per gallon) with similar features and dimensions as the current vehicle may be determined and suggested. Additional fuel cost data may be received by the vehicle 402 via the transceiver 408, and a cost associated with fuel savings from the suggested subsequent vehicle may be determined and presented to the driver (e.g., via the user interface 304). For example, when the suggested subsequent vehicle achieves a fuel efficiency of 60 miles per gallon (or electrical equivalent), the cost of fuel is $4.50 per gallon, and the driver travels an average of 12,522 miles per year (determined based on sensor data), a savings of over $1,878 per year on fuel cost may be determined and presented to the driver.

The vehicle 402 may be coupled to a network. The network, such as a local area network (LAN), a wide area network (WAN), a cellular network, a digital short-range communication (DSRC), LORA (Long Range), the Internet, or any other type of interconnectivity or combinations thereof, connects the vehicle 402 to a remote data server 412.

The transceiver 408 may include a communication port or channel, such as one or more of a Wi-Fi unit, a Bluetooth® unit, a Radio Frequency Identification (RFID) tag or reader, a DSRC unit, a LORA unit, or a cellular network unit for accessing a cellular network (such as 3G, 4G, or 5G) or any other wireless technology. The transceiver 408 may transmit data to and receive data from devices and systems not physically connected to the vehicle. For example, the ECU 404 may communicate with the remote data server 412. Furthermore, the transceiver 408 may access the network, to which the remote data server 412 is also connected.

The memory 410 is connected to the ECU 404 and may be connected to any other component of the vehicle. The memory 410 is configured to store any data described herein, such as the spatial data, image data, vibration data, engine sensor data, motor/generator sensor data, transmission sensor data, steering wheel sensor data, accelerator pedal data, brake pedal data, the data received from any other sensors, and any data received from the remote data server 412 via the transceiver 408.

The sensor data may be communicated from the vehicle 402 to the remote data server 412 via the transceiver 408 of the vehicle 402 and the transceiver 416 of the remote data server 412. The remote data server 412 includes a processor 414, a transceiver 416, and a memory 418, all connected to each other via a communications bus. The processor 414 (and any processors described herein) may be one or more computer processors configured to execute instructions stored on a non-transitory memory.

The memory 418 may be a non-transitory memory configured to store sensor data of the vehicle 402. The memory 418 may also store data associated with the design and features of the vehicle 402 in addition to the design and features of other vehicles that may be suggested to the driver. In an example embodiment, the memory 418 may store an ideal driver profile associated with each vehicle (and each trim level and each options package of each vehicle). The driver of the vehicle 402 may have a driver profile that is determined based on the sensor data of the vehicle 402. The driver profile of the driver of the vehicle 402 may be compared with each ideal driver profile of the many trim levels and options packages of each vehicle. Based on this comparison, an identification of one or more compatible vehicles may be made. The memory 418 may be a sorted collection of the sensor data received by the vehicle 402. The memory 418 may sort the data in any way that increases the processor's ability to efficiently access the data. The transceiver 416 may be configured to transmit and receive data, similar to transceiver 408.

The memory 418 may also store sensor data and/or driver profile data of the driver corresponding to previous vehicles owned and/or operated by the driver. This previous vehicle data of the driver may be used as additional data points of reference when determining one or more suggested subsequent vehicles for the driver. For example, when the driver had previously driven a small coupe without difficulty (based on the sensor data from the coupe) and the driver currently drives a large SUV with significant difficulty (based on the sensor data from the large SUV), the system may recommend a small coupe again. In another example, when the driver had previously driven a small coupe with even more difficulty (based on the sensor data from the coupe) than the large SUV that the driver currently drives (based on the sensor data from the large SUV), the system may recommend one or more vehicles similar in size to the large SUV, but with different features.

The remote data server 412 may be communicatively coupled to a computing device 420 used for displaying and/or determining a suggested subsequent vehicle for the driver of the vehicle 402. The remote data server 412 may be directly connected to the computing device 420 via a data cable or may be connected to the computing device 420 via a network, such as a local area network or the Internet.

The computing device 420 includes a processor 422, a memory 432, a transceiver 426, and a display 428, which may all be connected to each other via a communications bus. The processor 422 may be one or more computer processors configured to execute instructions stored on a non-transitory memory. The memory 432 may be a non-transitory memory configured to store data. The transceiver 426 may be configured to transmit and receive data, similar to transceivers 408 and 416.

In some embodiments, the processor 414 of the remote data server 412 is configured to determine trends based on the sensor data and determine one or more suggested subsequent vehicles based on the determined trends. In some embodiments, the processor 422 of the computing device 420 receives the sensor data stored in the memory 418 of the remote data server 412 and the processor 422 of the computing device 420 is configured to determine trends based on the sensor data and determine one or more suggested subsequent vehicles based on the determined trends. In some embodiments, a match percentage is determined for each of the one or more suggested subsequent vehicles, and the match percentage is displayed for the driver to view. The match percentage may indicate a compatibility of the driver and the new suggested vehicle based on the sensor data collected by the driver's current vehicle 402.

The processor 414 of the remote data server 412 and/or the processor 422 of the computing device 420 may use machine learning techniques to determine trends based on the sensor data and may also use machine learning techniques to determine one or more suggested subsequent vehicles. One or more algorithms for determining trends or outliers in the sensor data may also be used to determine any suggested subsequent vehicles.

The processor 422 is configured to render a graphical user interface (e.g., user interface 304) to facilitate displaying of suggested subsequent vehicles and features of the suggested subsequent vehicles that may improve the driving experience of the driver. As described herein, the user interface may be generated by computer software executed by the computing device 420 that is specially programmed and specially constructed to facilitate computer-aided vehicle sales and suggestions.

Once one or more suggested subsequent vehicles are determined by the processor 422 of the computing device 420 or the processor 414 of the remote data server 412, the display 428 (e.g., display screen of device 302) of the computing device 420 may automatically display an alert on the user interface to indicate that a different vehicle may be a better fit for the driver, as described herein.

In some embodiments, the computing device 420 is a mobile device associated with the driver of the vehicle 402, and the one or more suggested subsequent vehicles may be communicated to the driver's mobile device. For example, when the remote data server 412 determines one or more suggested subsequent vehicles for the driver, the remote data server 412 may communicate a message (e.g., app notification, email, text message) to the computing device 420 (e.g., a smartphone, tablet computer, laptop computer) of the driver. In some embodiments, the computing device 420 may be a part of an infotainment unit of the vehicle 402.

In some embodiments, the location sensor of the vehicle 402 communicates the location of the vehicle 402 to the remote data server 412, and when the vehicle 402 is located in or near a vehicle dealership, the suggested subsequent vehicles may be communicated from the remote data server 412 to the computing device 420 or the computing device 420 may retrieve the sensor data from the remote data server 412 and determine and display the suggested subsequent vehicles.

While only one remote data server 412 is shown, any number of remote data servers in communication with each other may be used. Multiple remote data servers may be used to increase the memory capacity of the data being stored across the remote data servers, or to increase the computing efficiency of the remote data servers by distributing the computing load across the multiple remote data servers. Multiple vehicles or sensors may be used to increase the robustness of sensor data. Multiple remote data servers may be interconnected using any type of network, or the Internet.

As used herein, a "unit" may refer to hardware components, such as one or more computer processors, controllers, or computing devices configured to execute instructions stored in a non-transitory memory.

Figure 5:
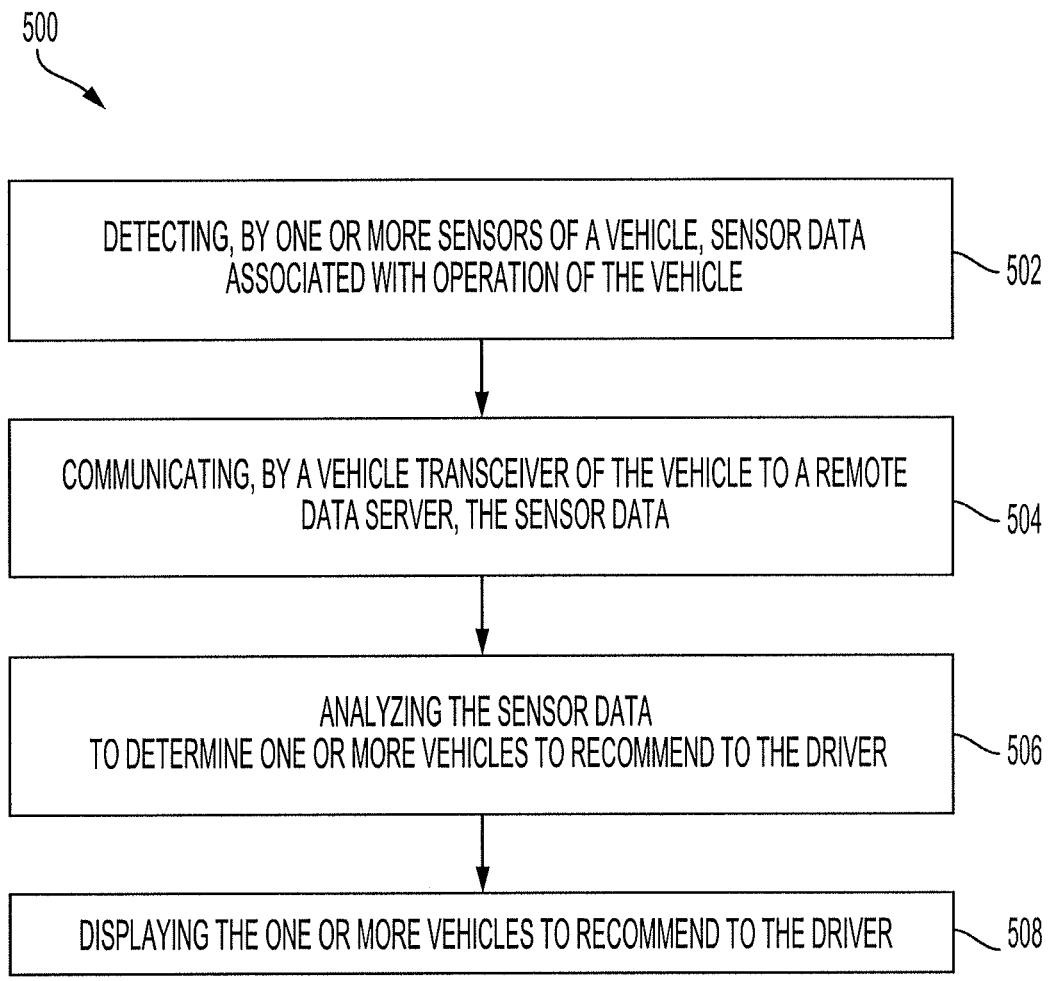
FIG. 5 illustrates a process of recommending a new vehicle to purchase, according to various embodiments of the invention.

FIG. 5 is a flow diagram of a process 500 for suggesting one or more subsequent vehicles using the systems and devices described herein.

One or more sensors (e.g., sensors 406) of a vehicle (e.g., vehicle 402) detect sensor data (step 502). The one or more sensors may include a spatial sensor, an image sensor, or a vibration sensor configured to detect a collision and determine a location of the collision on the vehicle, as described herein. The one or more sensors may also include an engine sensor, a motor/generator sensor, a transmission sensor, a steering wheel sensor, one or more weight sensors, an accelerator pedal sensor, and/or a brake pedal sensor, or any other sensors described herein.

As described herein, any or all of the sensors of the vehicle may be conventionally used for other purposes (e.g., parking assistance, driving assistance, lane assistance) but are used by the systems and methods described herein in an unconventional way.

A vehicle transceiver (e.g., transceiver 408) communicates the sensor data to a remote data server (e.g., remote data server 412) (step 504). The remote data server includes a transceiver (e.g., transceiver 416) for receiving the sensor data from the vehicle.

The remote data server receives the sensor data. The remote data server may automatically organize the sensor data based on the corresponding driver of the vehicle, and may store the sensor data in memory (e.g., memory 418). The remote data server may receive sensor data from a plurality of different vehicles having respective drivers.

The sensor data from the vehicle is analyzed to determine one or more vehicles to recommend to the driver of the current vehicle (step 506). This step may be performed by the remote data server or may be performed by a computing device (e.g., computing device 420) connected to the remote data server. As described herein, various techniques and methods may be used to determine the one or more vehicles to recommend to the driver of the current vehicle. However, all of the techniques require the use of a computer, such as computing device 420 or remote data server 412, to determine the one or more vehicles to recommend to the driver of the current vehicle. Without the processing capabilities of a computer, the sensor data is not able to be analyzed to determine the one or more vehicles to recommend in a timely manner, as the time that the driver is engaged with a salesperson or the time that the driver is interested and open to considering new vehicles is typically a very short period of time.

In some embodiments, a display screen is connected to the computing device, and the computing device renders a user interface for display by the display screen. On the user interface, there may be a display identifying the one or more vehicles to recommend to the driver of the current vehicle (step 508).

In some embodiments, the location data of the current vehicle may be identified to the remote data server, and the remote data server may be able to determine when the current vehicle is located at a vehicle dealership. The remote data server may communicate the one or more vehicles to recommend to the driver in response to the current vehicle being located at a vehicle dealership. The communication of the one or more vehicles to recommend to the driver may be sent to a computing device of an employee of the vehicle dealership or may be communicated to a computing device of the driver.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vehicle recommendation system comprising:
a current vehicle including:
one or more sensors configured to detect sensor data, the one or more sensors including at least one of a spatial sensor, an image sensor, or a vibration sensor configured to detect a collision and determine a location of the collision on the current vehicle, and
a vehicle transceiver configured to communicate the sensor data;
a remote data server configured to receive the sensor data from the current vehicle, and determine one or more vehicles to recommend to the driver of the current vehicle based on the detected collision and determined location of the collision on the current vehicle, the one or more vehicles having dimensions different from the current vehicle at the location of the collision on the current vehicle; and
a computing device coupled to the remote data server and configured to display information associated with the one or more vehicles to be recommended to the driver of the current vehicle.

2. The system of claim 1, wherein the one or more sensors include a plurality of passenger weight sensors configured to detect occupancy data of the current vehicle,
wherein the remote data server is configured to determine the one or more vehicles to recommend to the driver of the current vehicle based on the occupancy data.

3. The system of claim 1, wherein the one or more sensors include one or more cargo weight sensors configured to detect cargo data of the current vehicle,
wherein the remote data server is configured to determine the one or more vehicles to recommend to the driver of the current vehicle based on the cargo data.

4. The system of claim 1, wherein the one or more sensors include a fuel efficiency sensor configured to detect fuel efficiency data of the current vehicle,
wherein the remote data server is configured to determine the one or more vehicles to recommend to the driver of the current vehicle based on the fuel efficiency data.

5. The system of claim 1, further comprising a display screen connected to the computing device,
wherein the computing device is further configured to render a graphical user interface for interacting with a driver, and
wherein the graphical user interface includes an identification of the one or more vehicles to recommend to the driver of the current vehicle.

6. The system of claim 1, wherein the computing device is at least one of a mobile device associated with the driver or a computing device of a salesperson.

7. The system of claim 1, wherein the one or more sensors include a location sensor configured to detect location data of the current vehicle,
wherein the remote data server is configured to determine whether the current vehicle is at a vehicle dealership based on the location data, and
wherein the computing device displays the information associated with the one or more vehicles to be recommended to the driver of the current vehicle in response to the current vehicle being located at the vehicle dealership.

8. The system of claim 1, wherein the computing device is at least one of a smartphone, a tablet computer, or a laptop computer.

9. A vehicle recommendation system comprising:
a current vehicle including:
one or more sensors configured to detect sensor data, the one or more sensors including at least one of a spatial sensor, an image sensor, or a vibration sensor configured to detect a collision and determine a location of the collision on the current vehicle, and
a vehicle transceiver configured to communicate the sensor data; and
a computing device configured to:
receive the sensor data from the current vehicle,
determine one or more vehicles to recommend to the driver of the current vehicle based on the detected collision and determined location of the collision on the current vehicle, the one or more vehicles having dimensions different from the current vehicle at the location of the collision on the current vehicle, and
display information associated with the one or more vehicles to be recommended to the driver of the current vehicle.

10. The system of claim 9, wherein the one or more sensors include a plurality of passenger weight sensors configured to detect occupancy data of the current vehicle,
wherein the computing device is configured to determine the one or more vehicles to recommend to the driver of the current vehicle based on the occupancy data.

11. The system of claim 9, wherein the one or more sensors include one or more cargo weight sensors configured to detect cargo data of the current vehicle,
wherein the computing device is configured to determine the one or more vehicles to recommend to the driver of the current vehicle based on the cargo data.

12. The system of claim 9, wherein the one or more sensors include a fuel efficiency sensor configured to detect fuel efficiency data of the current vehicle,
wherein the computing device is configured to determine the one or more vehicles to recommend to the driver of the current vehicle based on the fuel efficiency data.

13. The system of claim 9, further comprising a display screen connected to the computing device,
wherein the computing device is further configured to render a graphical user interface for interacting with a driver, and
wherein the graphical user interface includes an identification of the one or more vehicles to recommend to the driver of the current vehicle.

14. The system of claim 9, wherein the computing device is at least one of a mobile device associated with the driver or a computing device of a salesperson.

15. The system of claim 9, wherein the one or more sensors include a location sensor configured to detect location data of the current vehicle, and
wherein the computing device is further configured to determine whether the current vehicle is at a vehicle dealership based on the location data, and display the information associated with the one or more vehicles to be recommended to the driver of the current vehicle in response to the current vehicle being located at the vehicle dealership.

16. The system of claim 9, wherein the computing device is at least one of a smartphone, a tablet computer, or a laptop computer.

* * * * *